(12) United States Patent
Paris et al.

(10) Patent No.: US 11,192,099 B2
(45) Date of Patent: Dec. 7, 2021

(54) MANUALLY-OPERATED MONO-CHANNEL OR MULTICHANNEL PIPETTES AND CONTROL BUTTON INTENDED FOR SUCH PIPETTES

(71) Applicant: GILSON SAS, Villiers-le-Bel (FR)

(72) Inventors: Nicolas Paris, Nancy (FR); Frédéric Sanquer, Tremblay-en-France (FR); Frédéric De Maack, Paris (FR)

(73) Assignee: GILSON SAS, Villiers-le-Bel (FR)

( * ) Notice: Subject to any disclaimer, the term of this patent is extended or adjusted under 35 U.S.C. 154(b) by 58 days.

(21) Appl. No.: 16/339,448

(22) PCT Filed: Oct. 9, 2017

(86) PCT No.: PCT/FR2017/052754
§ 371 (c)(1),
(2) Date: Apr. 4, 2019

(87) PCT Pub. No.: WO2018/069611
PCT Pub. Date: Apr. 19, 2018

(65) Prior Publication Data
US 2020/0047177 A1 Feb. 13, 2020

(30) Foreign Application Priority Data
Oct. 10, 2016 (FR) .................................... 16 59760

(51) Int. Cl.
*B01L 3/02* (2006.01)
*G01N 35/00* (2006.01)
*G01N 35/10* (2006.01)
(52) U.S. Cl.
CPC ...... *B01L 3/0237* (2013.01); *G01N 35/00871* (2013.01); *G01N 35/1009* (2013.01);
(Continued)

(58) Field of Classification Search
CPC ....... B01L 2200/0605; B01L 2200/143; B01L 2200/146; B01L 2200/147; B01L 2300/02;
(Continued)

(56) References Cited

U.S. PATENT DOCUMENTS 9,297,817 B2 * 3/2016 Zeng .................. G01N 35/1011
2004/0101440 A1 * 5/2004 Ishizawa ............ G01N 35/1009
422/64
(Continued)

FOREIGN PATENT DOCUMENTS

DE  19911397 A1  10/2000
FR   2986718 A1   8/2013
WO 2005085775 A1  9/2005

OTHER PUBLICATIONS

International Search Report for International Application No. PCT/FR2017/052754, dated Jan. 2, 2018.
(Continued)

*Primary Examiner* — John Fitzgerald
*Assistant Examiner* — Truong D Phan
(74) *Attorney, Agent, or Firm* — Pearne & Gordon LLP

(57) ABSTRACT

The invention relates to a manually-operated mono-channel or multi-channel pipette for the sampling and dispensing of a liquid sample in accordance with a given protocol, comprising a control button equipped with an autonomous control device which can supply a user with information relating to a pipetting operation in real time during the pipetting operation.

7 Claims, 2 Drawing Sheets

(52) U.S. Cl.
CPC . *B01L 2200/0605* (2013.01); *B01L 2200/146* (2013.01); *B01L 2300/023* (2013.01)

(58) Field of Classification Search
CPC ............ B01L 2300/023; B01L 3/0237; B01L 2200/14; B01L 3/02; B01L 3/022; B01L 2200/00; B01L 2300/021; B01L 2300/0627; B01L 2300/0636; B01L 2300/0663; B01L 2300/0861; B01L 2300/12; B01L 2300/123; B01L 2300/14; B01L 2300/18; B01L 2300/1888; B01L 2400/0478; G01N 35/00871; G01N 35/1009; G01N 35/1016
See application file for complete search history.

(56) References Cited

U.S. PATENT DOCUMENTS

| | | | | |
|---|---|---|---|---|
| 2004/0207385 | A1* | 10/2004 | Gafner | G01D 5/2412 324/76.11 |
| 2005/0247141 | A1* | 11/2005 | Belgardt | B01L 3/0234 73/864.01 |
| 2006/0085162 | A1* | 4/2006 | Bjornson | B01L 3/02 702/150 |
| 2009/0055131 | A1* | 2/2009 | Bukshpan | G01N 35/00871 702/187 |
| 2013/0095508 | A1* | 4/2013 | Campitelli | B01L 3/0217 435/7.94 |
| 2013/0271293 | A1* | 10/2013 | Jerusalem | B60Q 9/00 340/905 |
| 2013/0305844 | A1* | 11/2013 | Mohr | B01L 3/021 73/864.01 |
| 2014/0137980 | A1* | 5/2014 | Millet | G01F 11/029 141/1 |
| 2015/0004078 | A1* | 1/2015 | Baron | B01L 3/0217 422/521 |
| 2016/0220717 | A1* | 8/2016 | Petersson | B08B 3/08 |
| 2016/0273951 | A1* | 9/2016 | van der Schoot | G01F 11/029 |
| 2017/0370956 | A1* | 12/2017 | Hurwitz | C12M 1/34 |
| 2019/0107548 | A1* | 4/2019 | Bohnsack | G06Q 10/20 |

OTHER PUBLICATIONS

Written Opinion for International Application No. PCT/FR2017/052754, dated dated Jan. 2, 2018.
Preliminary French Search Report for French Patent Application No. 1659760 dated Jun. 23, 2017.

* cited by examiner

MANUALLY-OPERATED MONO-CHANNEL OR MULTICHANNEL PIPETTES AND CONTROL BUTTON INTENDED FOR SUCH PIPETTES

TECHNICAL FIELD

The invention is in the field of pipettes and more specifically relates to manually-operated single-channel or multi-channel pipettes for sampling and dispensing a sample of a liquid according to a predefined protocol and an actuating knob for equipping such pipettes. These pipettes are intended to be held in hand by an operator during the operations of sampling and dispensing the sample, these operations being made by moving an actuating knob obtained by applying, on this knob, an actuating axial pressure. The sequence of these actions on one or more pipettes is the execution of the predefined pipetting protocol.

STATE OF PRIOR ART

In pipettes from prior art, no check/validation of the volume actually dispensed by a manual pipette is possible in real time and directly apart from the hypothetical possibility to place the sample on weighing scales. Even in this case, the necessary accuracy for the weighing scales to measure the delivered volume complying with ISO8655 standard would be incompatible with the bulk and the total weight of the sample.

Keeping a manual or electronic laboratory notebook, supposed to reflect the different actions of the operator to record and validate them with respect to a protocol only imperfectly meets the traceability requirement since this register does not give information about the quality of the operation. Moreover, keeping this notebook requires active and continuous participation of the operator. Additionally, if the connection between instruments (pipettes or others) and laboratory information management systems (LIMS) is known, it is reserved for electronic or hybrid pipettes having by structure an autonomous supply, sensors, information processing systems and transceivers.

One purpose of the invention is to integrate on a manually-operated single-channel or multi-channel pipette an autonomous information system, not modifying the operator's gesture and not requiring his/her assistance, capable of informing him/her in real time of the validity of the operations performed.

DISCLOSURE OF THE INVENTION

This purpose is achieved by means of a manually-operated single-channel or multi-channel pipette for sampling and dispensing a sample of a liquid according to a predefined protocol including an actuating knob provided with an autonomous control device able to deliver to a user, in real time during a pipetting operation, information relating to said pipetting operation.

The autonomous control device according to the invention includes a microcontroller, a wireless communication module enabling said actuating knob to communicate, on the one hand, with a first set of sensors for measuring physical quantities peculiar to the pipette and a second set of sensors for providing to the autonomous control device data relating to the environment of the pipetting operation, and on the other hand, with an information processing apparatus which records any interpreted event from data provided by the first and second sets of sensors during the pipetting operation.

Preferentially, the autonomous control device further includes an alarm module adapted to generate an alert signal as a function of information read out by the first and second sets of sensors and analysed by the information processing apparatus so as to provide automatic control for performing the pipetting operation according to the predefined protocol without a direct intervention of the user.

According to another characteristic of the invention, the actuating knob is configured to communicate with other connected pipettes and/or with automated pipetting systems, and/or with connected instruments relating to the predefined pipetting protocol.

In a preferred embodiment of the invention, the first set of sensors includes means for measuring the movements of the actuating knob cooperating with means for measuring the amount of sampled and/or dispensed liquid, and the second set of sensors includes at least one clock, at least one motion and spatial position sensor, and at least one thermometer.

The means for measuring the movements of the actuating knob include at least one force sensor and/or one speed sensor and/or one acceleration sensor, and the means for measuring the sampled and/or dispensed liquid amount include at least one pressure and/or ultrasound sensor and/or one optical sensor.

The actuating knob equipping the manually-operated pipette according to the invention includes an autonomous control device comprising a microcontroller, a wireless communication module enabling said actuating knob to communicate, on the one hand, with a first set of sensors for measuring physical quantities peculiar to the pipette and a second set of sensors for providing to the autonomous control device data relating to the environment of the pipetting operation, and on the other hand, with an information processing apparatus which records any interpreted event from data provided by the first and second sets of sensors during the pipetting operation.

This knob further includes one or more sensors from those for measuring physical quantities peculiar to the pipette and one or more sensors from those intended to provide to the autonomous control device data relating to the environment of the pipetting operation.

Preferentially, the first set of sensors integrated to the pipette includes at least one force sensor, and the second set of sensors integrated or not to the pipette includes at least one clock, at least one motion and spatial position sensor, and at least one thermometer. The actuating knob according to the invention also includes an alert module adapted to generate an alert as a function of information read out by the first and second sets of sensors and analysed by the information processing apparatus so as to provide automatic control for performing the pipetting operation according to the predefined protocol without a direct intervention of the user.

In a preferred embodiment, the autonomous control device is configured to communicate with an information processing apparatus via the Bluetooth protocol so as to enable said information processing apparatus to send to a storage unit data shared by a group of permitted users relating to the environment of the pipetting operation.

BRIEF DESCRIPTION OF THE DRAWINGS

Further characteristics and advantages of the invention will become clearer from the description that follows, given by way of non-limiting example, in reference to the appended figures in which.

DETAILED DISCLOSURE OF PARTICULAR EMBODIMENTS

Figure 1:
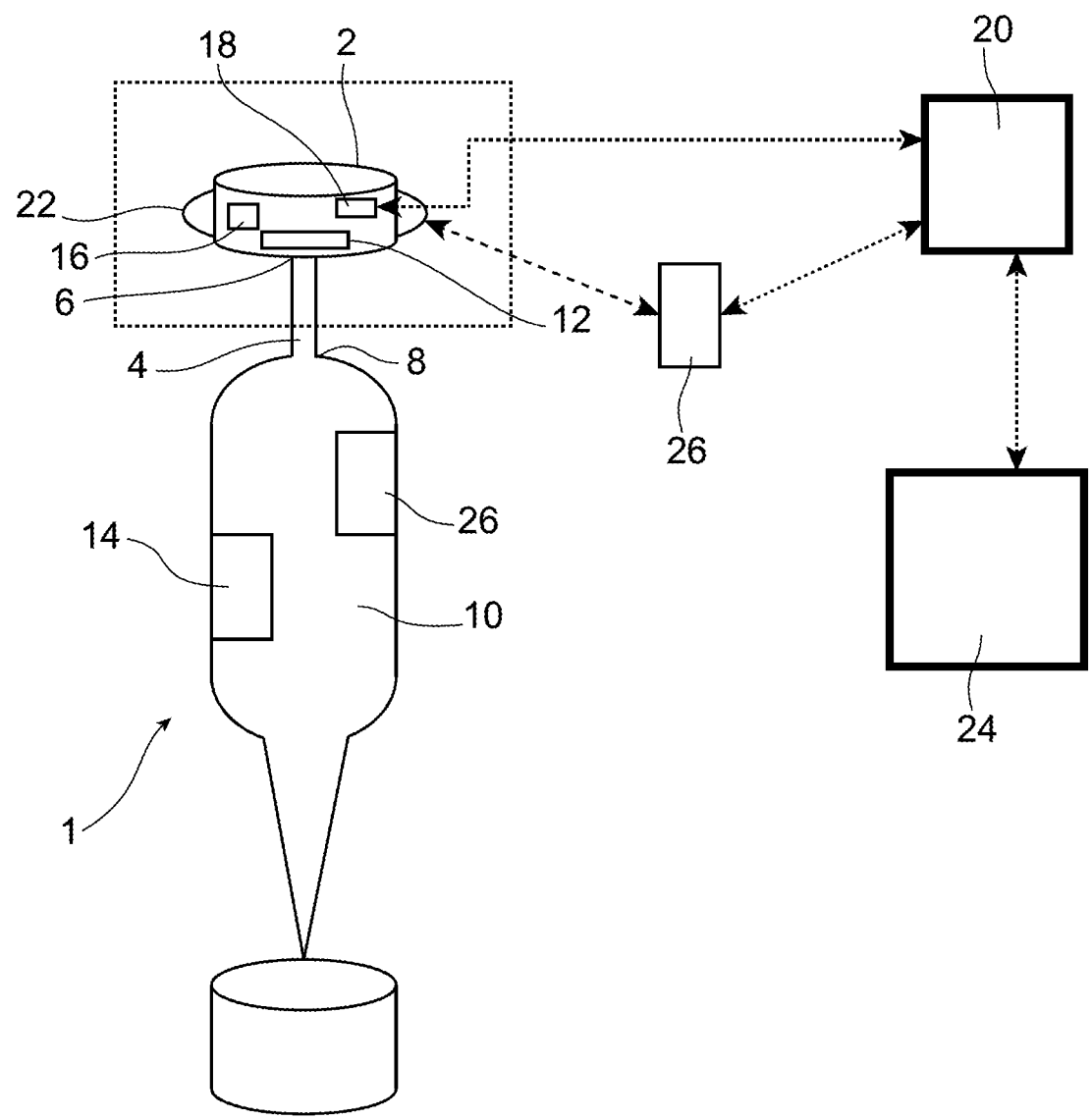
FIG. 1 schematically illustrates a pipette according to the invention.

FIG. 1 schematically illustrates a manually-operated single-channel or multi-channel pipette 1 provided with an actuating knob 2, an operating rod 4 the top end 6 of which is integral with the actuating knob 2 and the bottom end 8 of which operates the movement of a piston in a suction chamber 10. A force sensor 12 is arranged in the actuating knob 2 to detect the passage of the piston through a determined position, and a pressure sensor 14 is arranged in the suction chamber 10 to measure in real time the pressure corresponding to the compression and decompression motions of the gas volume included between the piston and the liquid to be sampled. The actuating knob 2 further includes an autonomous control device comprising a microcontroller 16 and a wireless communication module 18, being Bluetooth or Wifi for example, enabling said actuating knob to communicate, on the one hand, with the pressure sensor 14, and with several environmental sensors 26 such as for example a clock, a motion and spatial position sensor, a thermometer, and on the other hand, with an information processing apparatus 20 which records any interpreted event from data provided, during the pipetting operation, by the pressure sensor and the force sensor, and by the different environmental sensors. The pressure values measured during the pipetting operation are transmitted to the information processing apparatus 20 which draws in real time a curve representing the measured pressure variations as a function of time. The analysis of the obtained curve enables a fault to be detected in the pipetting operation and an alert to be triggered in real time by means of an alarm unit 22. In case of fault, the alarm unit immediately transmits to the user a haptic signal and/or an optical signal and/or an acoustic signal.

The information processing apparatus 20 is connected via a WIFI connection for example to a storage memory 24 in which data peculiar to the user's environment and shared by a group of permitted users (physical values, analysis results, documentation, history etc. . . . ) is recorded.

Figure 2:
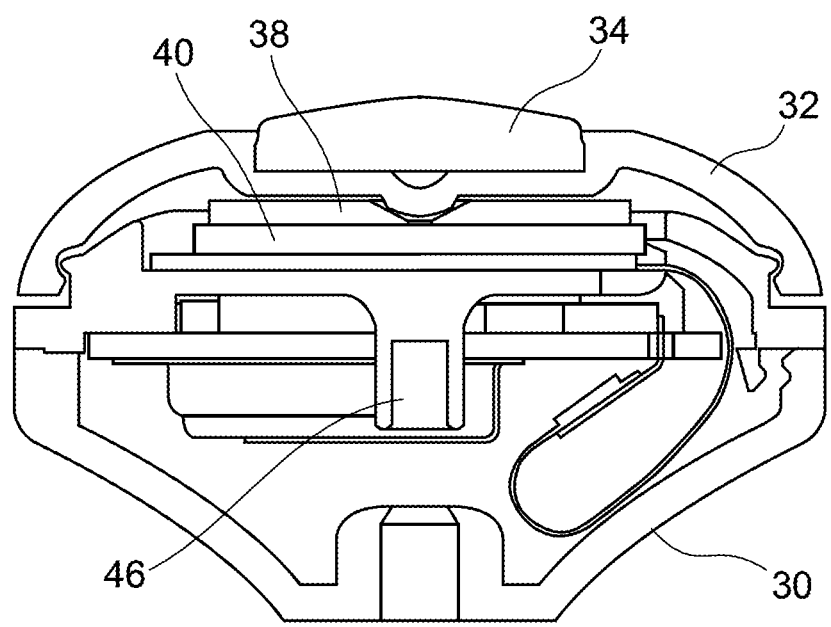
FIG. 2 schematically illustrates a knob according to the invention.
Figure 3:
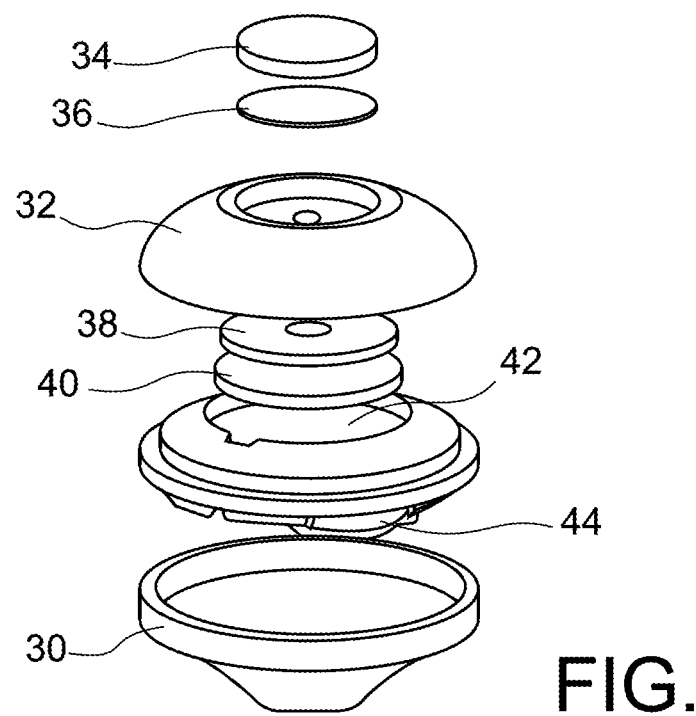
FIG. 3 is an exploded view of FIG. 2.

FIGS. 2 and 3 respectively represent a cross-section view and an exploded view of an actuating knob 2 equipping the pipette 1. This actuating knob consists of a base 30 under a metal ring 32 including a central opening accommodating a magnifier 34 covering an identification tag 36 including the identification of the model of the pipette 1. A strain distributing disk 38 is arranged above an elastomeric disk 40 overhanging the force sensor 42. An electronic board 44 including the microcontroller 16 associated to a memory in which the information specifically relating to the pipette (for example a serial number, a batch number as well as a single identification relating to the component used to ensure wireless communication (for example the address of the component ensuring the Bluetooth communication)) is recorded, the wireless communication module 18, and the electric supply of the actuating knob is under the disk 40.

The strain distributing disk 38, the elastomeric disk 40 and the force sensor 42 are drilled in the centre thereof to receive a light indicator 46.

In use, upon performing a given pipetting protocol, the operator selects on the information processing apparatus the pipetting protocol to be performed, conduct the pairing of the information processing apparatus with the pipette and the complementary accessories which will be used to perform the given protocol. If the contemplated pipetting operation requires several pipettes, each of these pipettes will be paired with the information processing apparatus by virtue of its single identification stored in the memory associated with the microcontroller 16. For this, the pipette or the accessory is activated by a pressure on the actuating knob which triggers sending of an electromagnetic signal via a wireless connection (for example a Bluetooth signal). The information contained in the message stored beforehand in the knob of the pipette or the accessory is then transmitted to the information processing apparatus. After pairing, each action on the pipette knob will trigger a reaction of the sensors integrated in the actuating knob 1 and the environmental sensors external to the actuating knob. Thus, the force sensor will react when it detects a pressure, validating thereby the performance of a suction or dispensing, the motion sensor will detect the use of the pipette or the accessory, the geographical positioning sensor will detect the spatial position of the pipette or of the accessory in the user's environment, and the real time clock will provide the accurate date and time of each event identified by each sensor.

The wireless communication module 18 sends a message containing all the information provided by each sensor to the information processing apparatus 20 which compares the sent information with the result expected in the current step of the pipetting protocol. On the other hand, the information collected by the information processing apparatus is cross-checked.

Thus, if a pipette and an accessory are used at the same time (deduction based on the information provided by the real time clocks), then the information processing apparatus 20 couples the information received from the pipette with that received from the accessory to generate new information which will be recorded in the report.

If the information processing apparatus 20 detects a fault in performing the protocol, it sends back to the concerned pipette an error signal by means of the wireless communication module 18. Upon receiving this error signal, the concerned pipette immediately generates an alert signal immediately perceivable by the user, either as a visual form (light indicator integrated to the knobs), or as an acoustic form, or a haptic form. In the latter form, the operator could feel a vibration at his/her thumb which would enable him/her to react immediately to the fault.

When the motion sensor is activated by moving the pipette, the position sensor enables the spatial position of the pipette to be checked. If this is in a zone in which it should not be, then an alert signal is sent to the operator which can avoid, for example, putting a contaminated pipette into a sterile zone or reversely. An extension of this use is contemplatable in the case of micro-titration plates (96 wells) avoiding or signalling thereby a dispensing error in a row or in a well.

When the motion sensor is activated, the pipette or accessory automatically checks the current date and the next maintenance or control date. If the current date is after the next maintenance or control date, then an alert is sent to the operator informing him/her that the pipette or accessory cannot be used.

The alerts thus listed, based on the information read out by the sensors and compared with the information relayed by the information processing apparatus 20, make it possible to have an increased control on performing pipetting protocols without the operator being asked to make these checks by himself/herself.

It is worth nothing that when the motion sensor is activated by a full manual pipetting operation, the microcontroller 16 triggers the continuous record of the pressure values of the dead space volume of the pipette and gives back a curve corresponding to these pressure values. This curve is compared in real time with a reference curve bounded by validity limits P+ and P−. If the measured curve departs from the validity field, an alarm is transmitted to the user.

It is to be noted that this control can be extended to any type of sensor which would inform about the pipetting accuracy and precision (detection of physical properties as viscosity, detection of the volume delivered by an ultrasound, optical, electromagnetic type signal . . . ) without departing from the scope of the invention.

What is claimed is:

1. A manually-operated single-channel or multi-channel pipette (1) for sampling and dispensing a sample of a liquid according to a user-selected predefined protocol, including an actuating knob (2) provided with a force sensor (12), and a suction chamber (10) provided with a piston and a pressure sensor (14), which pipette is characterised in that it further includes an autonomous control device arranged in said actuating knob (2) comprising a microcontroller (16), a wireless communication circuit (18) enabling said actuating knob (2) to communicate, on the one hand, with a first set of sensors for measuring physical quantities peculiar to the pipette and a second set of sensors for collecting data relating to an environment of the pipetting operation, and on the other hand, with an external information processing apparatus (20) configured to detect a fault in performing the user-selected predefined protocol by analysing variations as a function of a time of the pressure measured by the pressure sensor (14), and to deliver to a user, in real time, during a pipetting operation, information relating to said pipetting operation, and an operating rod (4) having a top end (6) integral with the actuating knob (2) and a bottom end (8) operating the movement of a piston in the suction chamber (10), the force sensor (12) being adapted to detect a passage of the piston through a determined position, and the pressure sensor (14) being adapted to measure in real time the pressure corresponding to compression and decompression motions of a gas volume included between the piston and the liquid to be sampled in order to allow drawing versus time a variation curve as a function of the time of the measured pressure, an analysis of said curve enabling a fault in the pipetting operation to be detected and an alarm signal to be transmitted in real time to the user.

2. The pipette according to claim 1, wherein the alarm signal transmitted to the user is haptic.

3. The pipette according to claim 1, wherein the alarm signal transmitted to the user is optical.

4. The pipette according to claim 1, wherein the alarm signal transmitted to the user is acoustic.

5. The pipette according to claim 1, wherein the actuating knob (2) is configured to communicate with other connected pipettes and/or with automated pipetting systems, and/or with connected instruments relating to the predefined pipetting protocol.

6. The pipette according to claim 1, characterised in that said autonomous control device further includes an alarm module (22) adapted to generate an alert signal as a function of information read out by the first and second sets of sensors and analysed by the information processing apparatus (20) so as to provide an automatic control for performing the pipetting operation according to the predefined protocol without a direct intervention of the user.

7. The pipette according to claim 6, wherein the first set of sensors includes the force sensor (12) configured for measuring the movements of the actuating knob cooperating with the pressure sensor configured for measuring the amount of sampled and/or dispensed liquid, and the second set of sensors includes at least one clock, at least one motion and spatial position sensor, and at least one thermometer.

* * * * *